Oct. 22, 1935.  J. F. CORNISH  2,018,487
OUTLET BOX HANGER
Filed Sept. 24, 1934  3 Sheets-Sheet 1
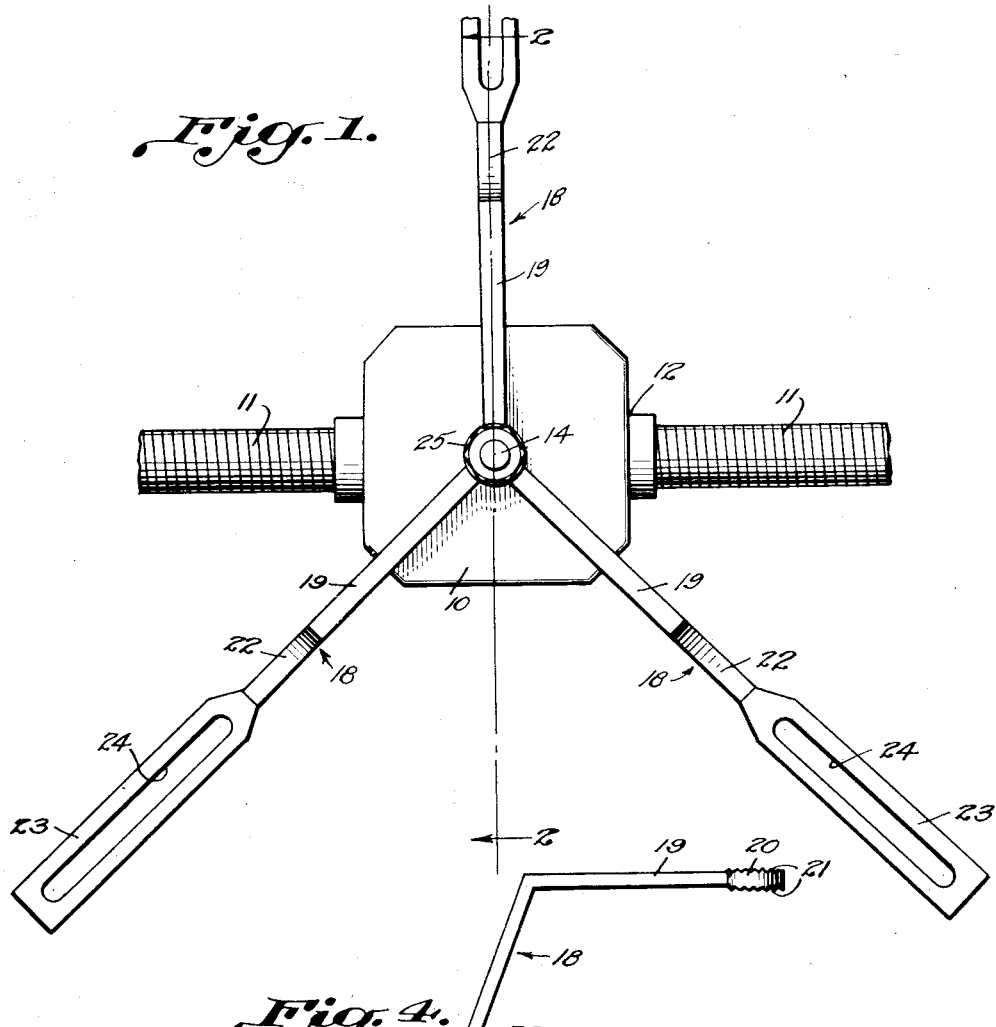
Inventor
John F. Cornish
By Miller & Miller
Attorneys Oct. 22, 1935.  J. F. CORNISH  2,018,487
OUTLET BOX HANGER
Filed Sept. 24, 1934  3 Sheets-Sheet 2
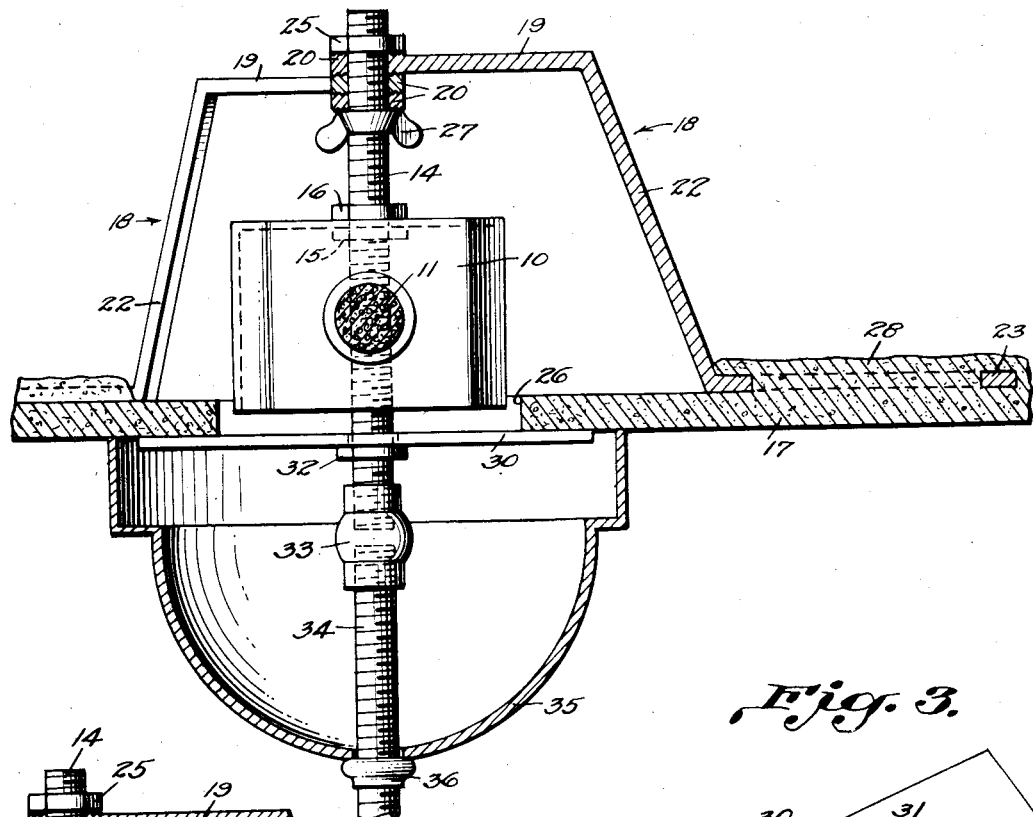
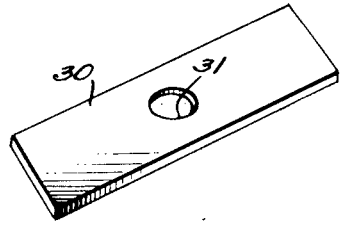
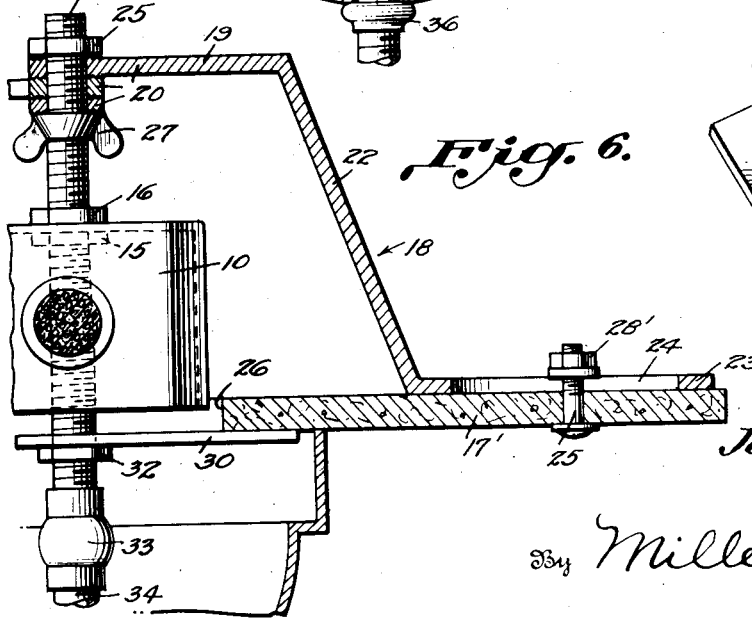
Inventor
John F. Cornish
By Miller & Miller
Attorneys Oct. 22, 1935.    J. F. CORNISH    2,018,487
OUTLET BOX HANGER
Filed Sept. 24, 1934    3 Sheets-Sheet 3
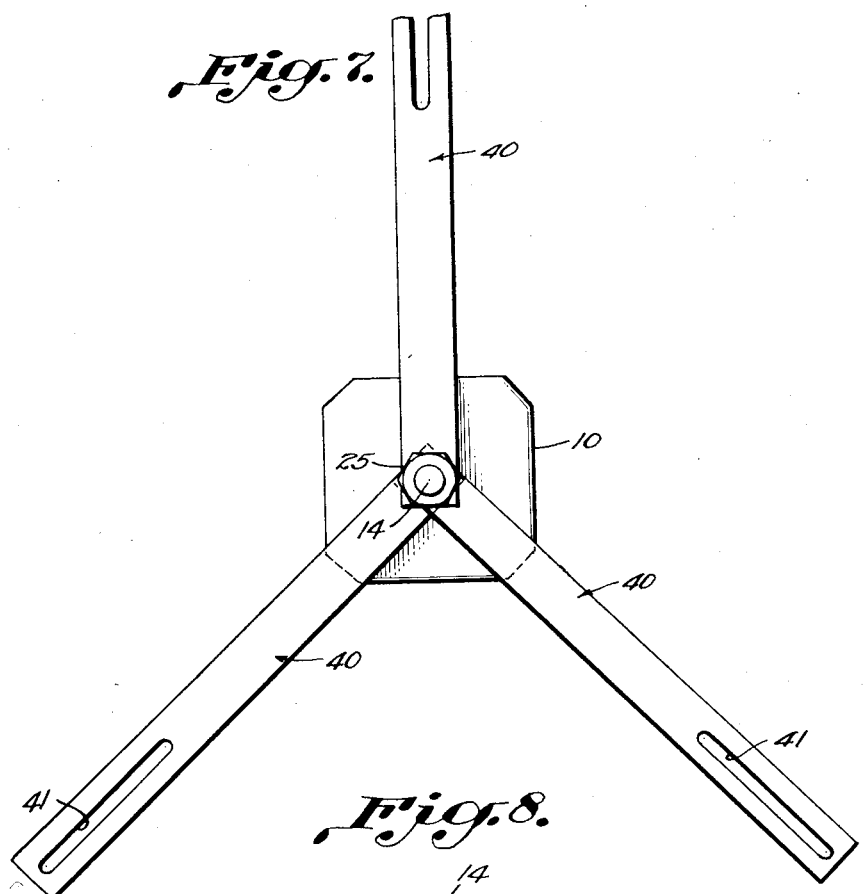
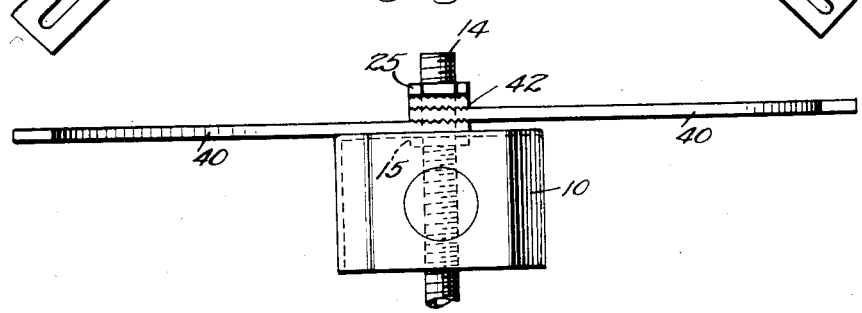
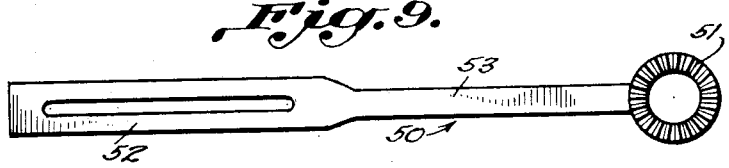
Inventor
John F. Cornish
By Miller & Miller
Attorneys Patented Oct. 22, 1935

2,018,487

UNITED STATES PATENT OFFICE 2,018,487

OUTLET BOX HANGER

John F. Cornish, New York, N. Y.

Application September 24, 1934, Serial No. 745,332

3 Claims. (Cl. 247—21)

This invention relates to an outlet box hanger and more particularly to a tripod electric outlet box hanger which can be easily and quickly installed either before or after a wall or ceiling is in position.

A further object of this invention is to provide a tripod electric outlet box hanger which when put together allows an outlet box to hang straight and solid thus allowing a workmanlike job.

Advantages of the tripod hanger of this invention include saving time in installing outlets in alteration work, allowing the outlet box to be more successfully fastened in a finished ceiling or a hung ceiling, allowing the outlet box to be more easily taken down or changed in the circuit wiring without disturbing the support, allowing the outlet box to be easily adjusted to the level of the ceiling or to any desired level, allowing the outlet box to be used in a ceiling that cannot be ripped open in order to fasten the hanger, allowing any type of electric outlet box to be used, and in an emergency allowing less than three arms of the tripod to be used in special places.

A further object of this invention is to provide a tripod electric outlet box hanger wherein the tripod arms may be made in different forms, as hereinafter described.

With the foregoing and other objects in view, as will hereinafter become apparent, this invention comprises the constructions, combinations, and arrangements of parts, hereinafter set forth, disclosed and shown on the accompanying drawings. In these drawings, Figure 1 is a plan view of the tripod hanger, Figure 2 is a sectional view of the invention applied taken approximately on the line 2—2 of Figure 1, Figure 3 is a perspective view of the supporting link bar, Figure 4 is a side elevation of one of the supporting arms, Figure 5 is a top plan view of the same, Figure 6 is a sectional view similar to Figure 2 showing another form of fastening the supporting arms, Figure 7 is a plan view of another form of hanger, Figure 8 is a front elevation of the same, Figure 9 is a top plan view of a modified form of support, and Figure 10 is a side elevation of the same.

There is shown at 10 a representation of a conventional type of outlet box which is to be supported by the device of this invention, this box 10 having the usual BX cable 11 secured to the open knockout 12 in the usual manner. Extending through a knockout in the top of the box 10 is the nipple 14 which is secured to the box 10 by a nut 15 within the box and a nut 16 on top of the box.

This nipple 14 it will be observed is threaded a substantial distance at each end and extends from below the level of the box 10 through the box 10 and above the level thereof. The nipple 14 being made fast to the box 10 by means of the nuts 15 and 16 it will be apparent that properly supporting the nipple 14 will in turn serve to properly support the box 10. Also by appropriately adjusting the nuts 15 and 16 along the length of the nipple 14 the position of the box 10 relative to the nipple 14 may be easily and quickly adjusted.

In order to support the box 10 relative to the ceiling 17 in which it is placed, there is provided the three tripod arms 18, forming the principal part of this invention. As shown in that form of the invention disclosed in Figures 1 to 6 inclusive, each arm 18 consists of a short leg 19 having one end formed into an eye 20 of a diameter at least equal to the diameter of the nipple 14. The upper and lower surfaces of this eye 20 are nicked or serrated as at 21. The other end of the short leg 19 is connected by an angular neck 22 to a long leg 23, the long leg 23 being provided with a longitudinal slot 24 of sufficient width to allow a machine screw 25 to be fastened therethrough as in Figure 6.

As will be observed the width of the neck 22 is much less than the width of the long leg 23 so as to allow the BX cable 11 to pass thereby with the least amount of interference. It will be further observed that the legs 19 and 23 extend in parallelism with each other but that their planes are displaced from each other by means of the connecting angular neck 22 a distance substantially greater than the height of the outlet box 10. Furthermore, in the three arms 18 making up the tripod set the vertical distance between the legs 19 and 23 will differ a slight amount between the three arms, the slight amount being the thickness of the arms so that the long leg 23 when placed in operative position may occupy the common plane and the short leg 19 will occupy successive adjacent planes. This difference in distance may be accomplished either by making each of the legs 22 of slightly different length or by making them of equal length and making the angle of the connecting legs 22 to the plane of the legs 19 and 23 respectively slightly different in each of the three arms 18.

To assemble the tripod hanger in operative position, the eye 20 of the three arms 18 are placed on the upper end of the nipple 14 and loosely held against a limiting nut 25 placed on the upper end of the nipple 14. The three arms 18 are placed together and then inserted through the opening 26 in the ceiling 17. Once they are through the opening 26 they are separated so as to form the proper angle with each other as shown in Figure 1, and the wing nut 27 is tightened against the eyes 20 holding the respective arms 18 at the desired angle to each other, this desired angle being preferably 120° and the serrations 21 on the eye 20 assist in preventing any angular movement of the arms relative to each other once the wing nut 27 has been secured.

If the ceiling 17 is of plaster the legs 23 of the arm 18 may then be anchored against the top of the ceiling 17 by placing the plaster 28 on each leg 23. If, as shown in Figure 6, the ceiling 17' is of metal or of material allowing a machine screw 25 to be threaded therethrough, then this machine screw 25 is inserted through the ceiling 17' and through the slot 24 and held to secure the leg 23 on top of the wall 17' by means of the screw nut 28'. The nut 16 may be then placed in position if not already in position on the nipple 14 at the time of inserting the arms 18 and the outlet box 10 is placed over the nipple with the knockout in the top of the box 10 passing over the nipple 14.

The nut 15 is then placed in position to secure the outlet box in position, the BX cable having been first connected up to provide the desired wire circuit therethrough.

In order to more firmly secure the box 10 against vibration a supporting link bar 30 of a length greater than the diameter of the opening 26 is placed over the nipple 14, the link bar 30 being provided with an opening 31 of a suitable diameter. This link bar 30 is then held on the nipple 14 by means of the nut 32. A fitting 33 is used to connect a tube 34 from which may depend a lamp or other electrical equipment, a ceiling fixture 35 being held by a nut 36 to entirely conceal the opening 26 and the link bar 30 making a neat finished workmanlike job.

In Figures 7 and 8 the tripod arms 40 extend in a common plane, being provided at one end with the screw slot 41 and at the other end with the serrated eye 42. In this form, the arms 40 are held against the top of the outlet box 10 by means of the limiting nut 25 on the nipple 14 and the inside nut 15 on the nipple 14 within the box 10.

In Figures 9 and 10 the serrated eye 51 to be placed about the nipple 14 is connected to the long and wide slotted legs 52 by means of a narrow neck 53 and is placed into operative position in the same manner as the form shown in Figures 7 and 8.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. An electric outlet box hanger comprising a nipple to which the outlet box is adapted to be secured, a plurality of supporting arms, each arm terminating in an eye securable to said nipple, a slotted leg formed at the other end of each arm, said slotted leg and said eye being in parallel planes, an angular neck connecting said slotted leg to said eye, said nipple extending completely through said outlet box, and a link bar on said nipple below said outlet box, said link bar being adapted to straddle the ceiling opening through which said outlet box is located.

2. A tripod electric outlet support comprising a nipple extending through a knockout of the outlet box, nut means securing said outlet box to said nipple within and without said box, a plurality of tripod arms, each tripod arm comprising a long slotted leg, a short leg, an angular neck connecting said long and short leg, said long and short leg being in parallel planes, a serrated eye formed on the other end of said short leg, said serrated eye being adapted to be received over said nipple, a limiting nut on the end of said nipple, a lock nut securing said serrated eye of said arms against said limiting nut, the long leg of said tripod arms being secured on the inside of a ceiling, a link bar on said nipple below said outlet box, nut means securing said link bar on said nipple with its end straddling the ceiling opening.

3. A tripod electric outlet support comprising a nipple extending through a knockout of the outlet box, nut means securing said outlet box to said nipple within and without said box, a plurality of tripod arms, each tripod arm comprising a long slotted leg, a short leg, an angular neck connecting said long and short leg, said long and short leg being in parallel planes, a serrated eye being adapted to be received over said nipple, a limiting nut on the end of said nipple, a lock nut securing said serrated eye of said arms against said limiting nut, the long leg of said tripod arms being secured on the inside of a ceiling, a link bar on said nipple below said outlet box, nut means securing said link bar on said nipple with its end straddling the ceiling opening, a fitting adapted to be secured to the lower end of said nipple, a fixture tubing secured to said fitting, a fixture member secured to said tubing and concealing said outlet box and link bar.

JOHN F. CORNISH.